US008365897B2

(12) United States Patent
Besnard et al.

(10) Patent No.: US 8,365,897 B2
(45) Date of Patent: Feb. 5, 2013

(54) SAFETY AND RESCUE DEVICE FOR MOUNTAIN CONVEYOR BELT

(75) Inventors: Jérome Besnard, Saint Germain les Corbeil (FR); William Saillard, Saint Martin sur Oreuse (FR)

(73) Assignee: Ficap, Bray-sur-Seine (FR)

( * ) Notice: Subject to any disclaimer, the term of this patent is extended or adjusted under 35 U.S.C. 154(b) by 386 days.

(21) Appl. No.: 12/732,226

(22) Filed: Mar. 26, 2010

(65) Prior Publication Data

US 2010/0258402 A1 Oct. 14, 2010

(30) Foreign Application Priority Data

Mar. 27, 2009 (FR) ..................................... 09 01519

(51) Int. Cl.
*B65G 43/00* (2006.01)

(52) U.S. Cl. ....................................... 198/322; 198/323

(58) Field of Classification Search .......... 198/321–338, 198/812

See application file for complete search history.

(56) References Cited

U.S. PATENT DOCUMENTS

| | | | | |
|---|---|---|---|---|
| 2,030,103 | A * | 2/1936 | Dunlop | 198/323 |
| 3,052,337 | A | 9/1962 | Force, Sr. | |
| 3,835,977 | A * | 9/1974 | Hewitt et al. | 198/323 |
| 3,944,037 | A * | 3/1976 | Stease | 193/35 TE |
| 5,398,800 | A * | 3/1995 | Hofling et al. | 198/323 |
| 5,769,201 | A * | 6/1998 | Dwight et al. | 198/323 |
| 6,142,286 | A | 11/2000 | Ulrich et al. | |
| 6,752,255 | B2 * | 6/2004 | Lefeuvre | 198/323 |
| 6,966,419 | B2 * | 11/2005 | Tada | 198/323 |

FOREIGN PATENT DOCUMENTS

| | | | |
|---|---|---|---|
| EP | 0 801 021 | A2 | 10/1997 |
| JP | 51-109597 | U | 9/1976 |
| JP | 1-164284 | U | 11/1989 |
| WO | 2007/066015 | A2 | 6/2007 |

OTHER PUBLICATIONS

French Search Report, dated Oct. 28, 2009, from corresponding French application.

* cited by examiner

*Primary Examiner* — Gene Crawford
*Assistant Examiner* — William R Harp
(74) *Attorney, Agent, or Firm* — Young & Thompson

(57) ABSTRACT

A safety and rescue device (1) for a mountain conveyor belt (2) includes a frontal blade (7) in the vicinity of and/or in contact with the transporting band (**2*d*) of the conveyor belt (2). The frontal blade (7) is a pressure sensor or a pressure-sensitive blade. The frontal blade (7) is integral with a flap (4) that slides between a closed position and an open position, moved by winding or unwinding on a motorized winding tube (10**).

19 Claims, 2 Drawing Sheets

SAFETY AND RESCUE DEVICE FOR MOUNTAIN CONVEYOR BELT

BACKGROUND OF THE INVENTION

Figure 1:
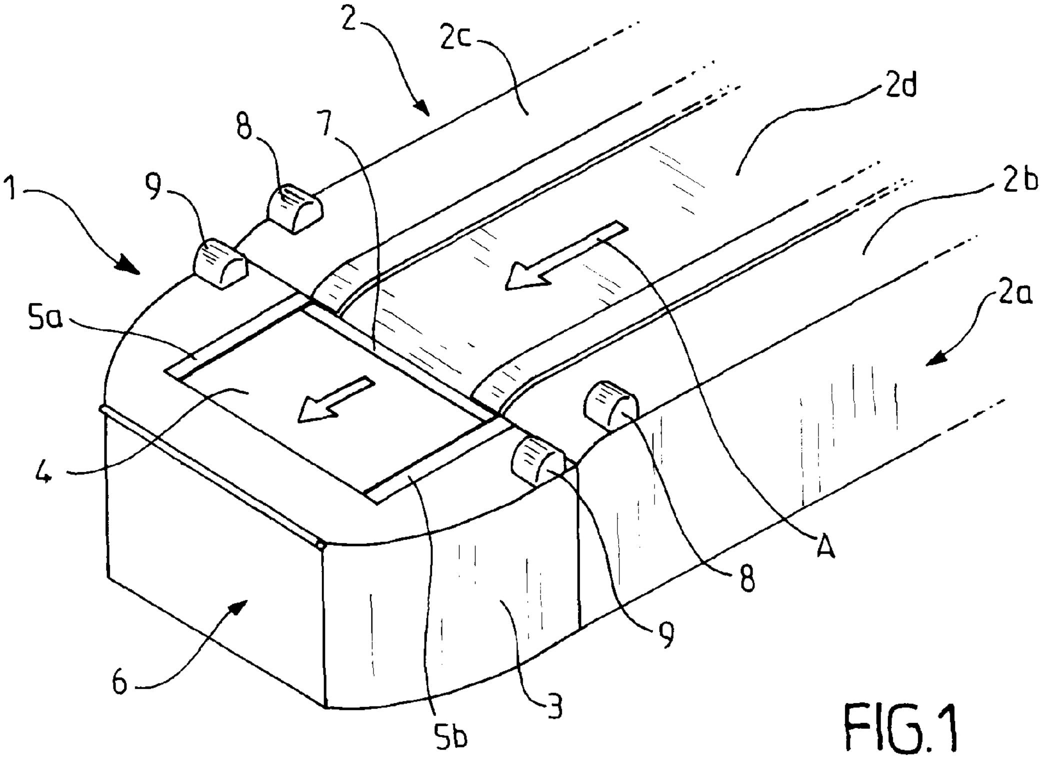

The invention relates to a safety and rescue device for a mountain conveyor belt.

DESCRIPTION OF THE RELATED ART

The mountain conveyor belts are designed for the transfer of personnel or skiers between a departure or boarding station and an arrival or disembarkation station. These conveyor belts are useful in particular in ski or mountain stations for the transfer of skiers or pedestrians equipped with ski shoes or snow boots.

Because this equipment is subjected to inclement weather, to snowfall, and to freezing cold, its operation should satisfy restrictive safety standards so that any risk of an individual having an accident is prevented.

The document WO 2007/066 015 describes a safety device for a conveyor belt that is designed for the transfer of personnel or skiers, comprising a frontal blade in the vicinity of and/or in contact with the transporting band of the conveyor belt, in which means of pivoting downward and toward the inside cause the retraction of a removable hatch of the arrival station.

The device of the document WO 2007/066 015 provides complete satisfaction for conveyor belt speeds of close to 0.7 m/s.

For speeds that are significantly higher than 0.7 m/s, the device of the document WO 2007/066 015 would make it necessary to subject the conveyor belt to a significant deceleration that creates the risk of passengers falling off the conveyor belt.

SUMMARY OF THE INVENTION

A first object of the invention is to provide a new safety and rescue device that allows a slowing of the conveyor belt with a deceleration that is compatible with the balance of the passengers of the conveyor belt.

A second object of the invention is to provide a new safety and rescue device that makes possible remote snow removal before the activation of the conveyor belt.

The invention has as its object a safety and rescue device for a mountain conveyor belt, comprising a frontal blade in the vicinity of and/or in contact with the transporting band of the conveyor belt, in which the frontal blade is a pressure sensor or a pres sure-sensitive blade, and by the fact that the frontal blade is integral with a flap that slides between a closed position and an open position, characterized by the fact that the sliding flap is moved by winding or unwinding on a motorized winding tube.

According to other alternative characteristics of the invention:

- The sliding flap is mounted to slide in two lateral guides.
- The sliding flap is a sectional flap.
- The sliding flap is a motorized sliding flap.
- The sliding flap movement is controlled by a linear or rotary actuator.
- The sliding flap is moved by a motorized translational means.
- The device comprises at least one photoelectric barrier.
- The device comprises two photoelectric barriers and a safety means for opening the sliding flap for simultaneous blocking of said barriers for a predetermined time interval.
- The device comprises a means for remote control of the transporting band (2*d*) and the sliding flap.

BRIEF DESCRIPTION OF THE DRAWING FIGURES

The invention will be better understood using the following description that is provided by way of nonlimiting example with reference to the accompanying drawings in which:

FIG. 1 diagrammatically shows a perspective view of a device according to the invention in closed position.

Figure 2:
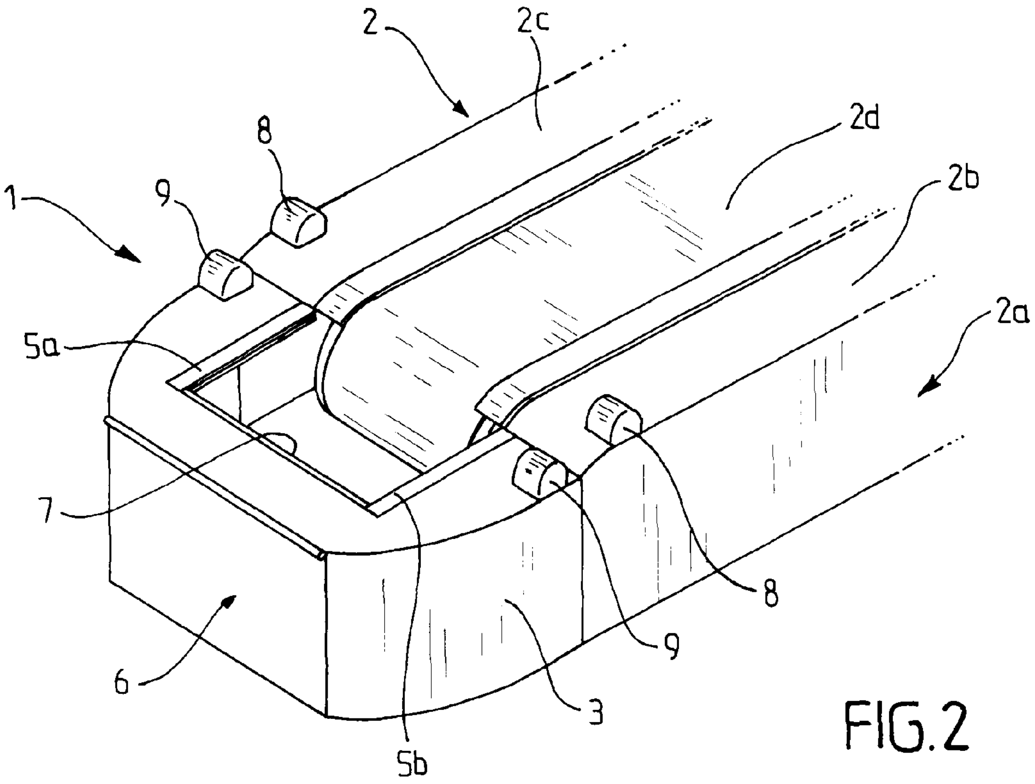

FIG. 2 diagrammatically shows a perspective view of the device according to the invention in open safety position.

Figure 3:
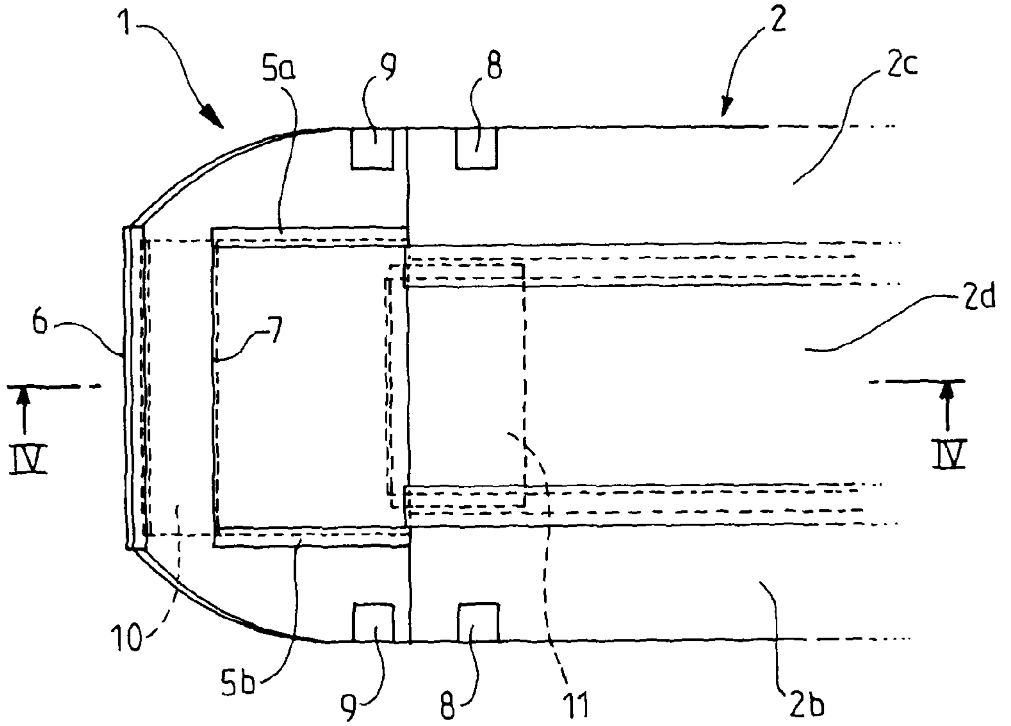

FIG. 3 diagrammatically shows a top view of the device according to the invention in open safety position.

Figure 4:
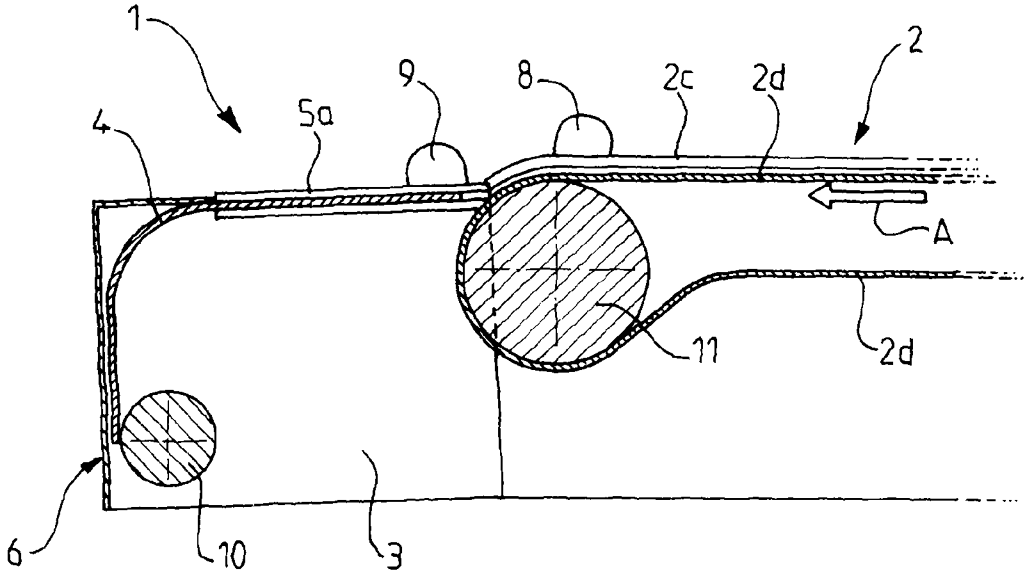

FIG. 4 diagrammatically shows a cutaway view through a vertical median plane IV-IV of the device according to the invention in closed position.

DETAILED DESCRIPTION OF THE INVENTION

With reference to FIGS. 1 to 4, the identical or functionally equivalent elements are referenced by identical reference numbers.

In FIG. 1, a device (1) according to the invention is arranged at the end of a conveyor belt unit (2).

In a known manner, the conveyor belt unit (2) comprises a box (2*a*) that has two curbs (2*b*, 2*c*) and a transporting band (2*d*).

The device (1) according to the invention comes in the form of a chest (3) that forms a safety well, with a sliding flap (4) in two lateral guides (5*a*, 5*b*) and an opening panel (6).

The device is equipped with a frontal blade (7) that is integral with the sliding flap (4).

When a user of the conveyor belt circulates in the direction of the arrow A, his passage is detected by a first pair of photoelectric cells (8) that forms a photoelectric barrier and optionally by a second pair of photoelectric cells (9) that forms a photoelectric barrier.

If an obstacle or a user of the conveyor belt exerts a force, in his movement, on the frontal blade (7) that is sensitive to pressure or is detected simultaneously by the photoelectric barriers (8 and 9) for a predetermined time interval, a motorized control opens the sliding flap (4) to keep from catching an arm or a limb or a piece of the user's clothing.

The sliding flap (4) is then driven in the direction of the arrow by a motorized control that is not shown in detail, such that the space between the transporting band (2*d*) of the frontal blade (7) opens out at a speed that is compatible with that of the transporting band (2*d*).

The sliding flap (4) is retracted up to the position that corresponds to FIG. 2.

In FIG. 2, the opening that is initiated by the running flap (4) is entirely cleared.

The transporting band (2*d*) is immobilized upon shutdown, even though the sliding flap (4) has not reached its closing position.

Access to the inside well of the chest (3) makes it possible to release any object or any individual that has been grabbed by the returning angle of the transporting band (2*d*).

The width of the opening is greater than that of the transporting band (2*d*) while the length of the opening is based on the stopping distance of the conveyor belt, whereby this length is determined to prevent too strong a deceleration that could make a passenger or a user of the conveyor belt fall.

According to the invention, the sliding flap (4) is a motorized sliding flap whose translational movement is controlled by the photoelectric barriers (8 and 9) or by a pressure or a force that is exerted on the contact blade (7) or else by a voluntary action of an operator.

Actually, the advantage of a motorized sliding flap is to be able to remotely open and close this motorized rolling flap when the transporting band (2*d*) is not transporting a user or passenger. In particular, in the case of starting or in the case of stopping, good operation of the sliding flap can be tested by an operator.

Also, in the case of a significant snowfall, the opening and the closing of the sliding flap makes it possible to implement an automatic snow removal from the end of the transporting band (2*d*).

The control by action of an operator can also be replaced by an automatic control coupled with the operational cycles of the conveyor belt (2).

Finally, the translational sliding of the rolling flap makes it possible to reduce to a minimum the space that is between the contact blade (7) and the returning angle of the transporting band (2*d*).

In FIG. 3, a preferred embodiment of the device according to the invention comprises a tubular actuator that is designed to entrain a winding tube (10) of the sliding flap (4).

The tubular actuator generally comprises a geared motor, not shown, that is inserted inside the winding tube (10).

The sliding flap (4) can be in the form of a sectional flap or a continuous flap.

The frontal blade of contact (7) defines the winding end of the flap (4).

The configuration of FIG. 3 corresponds to an opening of the sliding flap (4) and to a possibility of rescue intervention inside the well that is defined by the chest (3).

This open position also corresponds to an automatic snow removal before starting the transporting band (2*d*).

After snow removal, the transporting band (2*d*) that is guided by the roller or the drive drum (11) is started in the direction of the arrow A.

After having carried out the snow removal or the rescue intervention, the engine or tubular actuator can be controlled in reverse direction so as to unwind the sliding flap (4) in the guides (5*a*, 5*b*) up to the closing position that is shown in FIG. 4.

In FIG. 4, the sliding flap (4) that is engaged in the lateral guides (5*a*, 5*b*) is in closing position with its frontal blade (7) that forms a pressure sensor upon contact with the transporting band (2*d*).

The space that is inside the device is thus totally closed and the transporting band (2*d*) can be controlled in the direction of travel that corresponds to the arrow A.

If the photoelectric barriers (8 and 9) are simultaneously blocked beyond a predetermined time interval, the stop command is transmitted to the transporting band (2*d*) and the opening command is transmitted to the tubular actuator of the winding tube (10) so as to bring about the opening of the device and the winding of the sliding flap (4).

The same operation is carried out if a pressure contact that is greater than a predetermined threshold is felt by the contact blade (7) that is integral with the end of the sliding flap (4).

Finally, a start-up cycle can be provided that corresponds to a slight opening of the sliding flap (4) to facilitate the evacuation of snow, then a start-up of the transporting band (2*d*), and then a closing of the sliding flap (4) so as to bring the contact blade (7) closer to the transporting band (2*d*) in movement in the direction of the arrow A.

A means of emergency stopping, not shown, can also be provided on or in the vicinity of the device according to the invention.

Finally, the device according to the invention can also be combined with remote display means, compatible with a remote control that allows a reactivation time of the transporting band (2*d*) upon the closing of the sliding flap (4) after resolving a minor incident that does not require human intervention or on-site movement.

The invention that is described with reference to particular embodiments is in no way limited thereto and indeed covers any modifications of shape and any variant embodiments within the scope and the spirit of the invention.

Thus, the winding tube (10) can be replaced by any other means that can move the sliding flap (4), for example a linear actuator, a linear engine, or any other engine or drive means that can generate a movement of the sliding flap (4) in its guides (5*a*, 5*b*).

What is claimed is:

1. A device (1) for safety and rescue (2) for a mountain conveyor belt having a transporting band (2*d*), comprising:

a flap (4) slidable between a closed position and an open position;

a frontal blade (7) wherein in the closed position of the flap, a longitudinal edge of the frontal blade (7) is in at least one of i) a vicinity of an end of the transporting band (2*d*) and ii) in contact with the transporting band (2*d*), wherein the frontal blade (7) is one of i) a pressure sensor ii) a pressure-sensitive blade, wherein the frontal blade (7) is integral with the flap (4); and a motorized winding tube (10) arranged to move the sliding flap (4) between the closed position and the open position responsive to pressure sensed by the frontal blade (7).

2. Device according to claim 1, further comprising two lateral guides (5*a*, 5*b*), wherein the sliding flap (4) is mounted to slide in the two lateral guides (5*a*, 5*b*).

3. Device according to claim 2, wherein the sliding flap (4) is a continuous flap.

4. Device according to claim 2, wherein the sliding flap (4) is a motorized sliding flap.

5. Device according to claim 1, wherein the sliding flap (4) is a continuous flap.

6. Device according to claim 5, wherein the sliding flap (4) is a motorized sliding flap.

7. Device according to claim 1, wherein the sliding flap (4) is a motorized sliding flap.

8. Device according to claim 7, wherein the sliding flap (4) is a motorized sliding flap whose translational movement is controlled by at least one photoelectric barrier (8, 9).

9. Device according to claim 1, in combination with a mountain conveyor belt.

10. Device according to claim 9, wherein the sliding flap (4) is a motorized sliding flap having translational movement controlled by photoelectric barriers (8, 9).

11. Device according to claim 1, wherein the device comprises at least one photoelectric barrier (8, 9).

12. Device according to claim 1, wherein the device comprises two photoelectric barriers (8, 9), the photoelectric barriers detecting an obstacle for a predetermined time interval causing the sliding flap (4) to open.

13. Device according to claim 1, wherein the transporting band (2*d*) and the sliding flap (4) are configured for remote control.

14. Device according to claim 1, further comprising:

two lateral guides (5*a*, 5*b*), wherein the sliding flap (4) and the frontal blade (7) are mounted to slide in the two lateral guides (5*a*, 5*b*).

in the closed position, the frontal blade (7) and an immediately adjoining first end portion of the flap (4) are in a generally horizontal orientation, and an opposite second end portion of the flap is in a generally orientation with the second end portion engaged with the motorized winding tube (10), and in the open position, the longitudinal edge of the frontal blade (7) and the immediately adjoining first end portion of the flap (4) are located at a spaced apart distance from the end of the transporting band (2*d*) so as to define an open space delimited by the longitudinal edge of the frontal blade (7), the two lateral guides (5*a*, 5*b*), and the end of the transporting band (2*d*).

15. A combination of a safety device (1) and a conveyor belt unit (2), comprising:

a transporting band (2*d*);

a conveyor belt unit box (2*a*) with two curbs (2*b*, 2*c*) covering respective lateral edges of the transporting band (2*d*); and a chest (3) forming a safety well, the chest (3) comprising i) a sliding flap (4), ii) two lateral guides (5*a*, 5*b*), the sliding flap (4) slidable in the two lateral guides (5*a*, 5*b*) between an open position and a closed position, iii) a pressure-sensitive frontal blade (7) integral with the sliding flap (4), and iv) a motorized winding unit (10) arranged to move the sliding flap (4) and the frontal blade (7) between the closed position and the open position, wherein, the frontal blade (7) is operative to detect pressure and thereupon have the motorized winding tube move the flap (4) from the closed position to the open position, in the closed position, a longitudinal edge of the frontal blade (7) is in a vicinity of an end of the transporting band (2*d*), the frontal blade (7) and an immediately adjoining first end portion of the flap (4) are in a generally horizontal orientation, and an opposite second end portion of the flap is in a generally vertical orientation with the second end portion engaged with the motorized winding tube (10), and in the open position, the longitudinal edge of the frontal blade (7) and the immediately adjoining first end portion of the flap (4) are located at a spaced apart distance from the end of the transporting band (2*d*) so as to define an opening into the safety well, the opening delimited by the longitudinal edge of the frontal blade (7), the two lateral guides (5*a*, 5*b*), and the end of the transporting band (2*d*).

16. The combination of claim 15, further comprising:

a first pair of photoelectric cells (8) located on the two curbs (2*b*, 2*c*) and forming a first photoelectric barrier at an end of the transporting band (2*d*); and a second pair of photoelectric cells (9) located on the chest and forming a second photoelectric barrier across the two lateral guides (5*a*, 5*b*), the first and second photoelectric barriers operative to move the flap (4) from the closed position to the open position and to cause issuance of a stop command for stopping the transporting band.

17. The combination of claim 16, a width of the opening between the two lateral guides (5*a*, 5*b*) is greater than a width of the transporting band (2*d*).

18. The combination of claim 15, wherein, the motorized winding unit is a motorized winding tube.

19. The combination of claim 15, wherein, the frontal blade (7) is operative, upon detecting the pressure to cause issuance of a stop command for stopping the transporting band.

* * * * *